United States Patent [19]

Pochter

[11] 4,426,812
[45] Jan. 24, 1984

[54] INTERIOR COVERING MATERIAL FOR A GREENHOUSE

[75] Inventor: Keith A. Pochter, Glencoe, Ill.

[73] Assignee: Argyle Management Company, Northbrook, Ill.

[21] Appl. No.: 277,070

[22] Filed: Jun. 25, 1981

[51] Int. Cl.$^3$ .............................................. E04B 7/00
[52] U.S. Cl. ......................................... 52/22; 52/476; 52/481; 52/483
[58] Field of Search ................... 52/22, 476, 481, 483, 52/762, 460, 461, 487, 762, 90, 788; 47/17

[56] References Cited

U.S. PATENT DOCUMENTS

| | | | |
|---|---|---|---|
| 1,763,275 | 6/1930 | Thomas | 52/461 X |
| 2,056,444 | 10/1936 | Briggen | 52/461 X |
| 2,182,852 | 12/1939 | Mulford | 52/22 |
| 4,194,334 | 3/1980 | Katona | 52/788 X |

Primary Examiner—Carl D. Friedman
Attorney, Agent, or Firm—Silverman, Cass & Singer, Ltd.

[57] ABSTRACT

A formation of interior covering material is furnished for a greenhouse or covered atrium enclosure which has an original formation of exterior covering material to achieve a thermal-like insulation structure for the greenhouse-enclosure. The enclosure includes vertically aligned mullions having central portions or standards and marginal flanges extending from a sill to a head. The mullions carry panels of exterior covering material which provide a single glazing. The interior covering material is formed of flexible panels of synthetic resins which are bowed and inserted between the mullion standards and rest on the flanges. Associated members are provided to seal the space formed between the interior and exterior panels and furnish dimensional stability to the interior panels.

18 Claims, 7 Drawing Figures

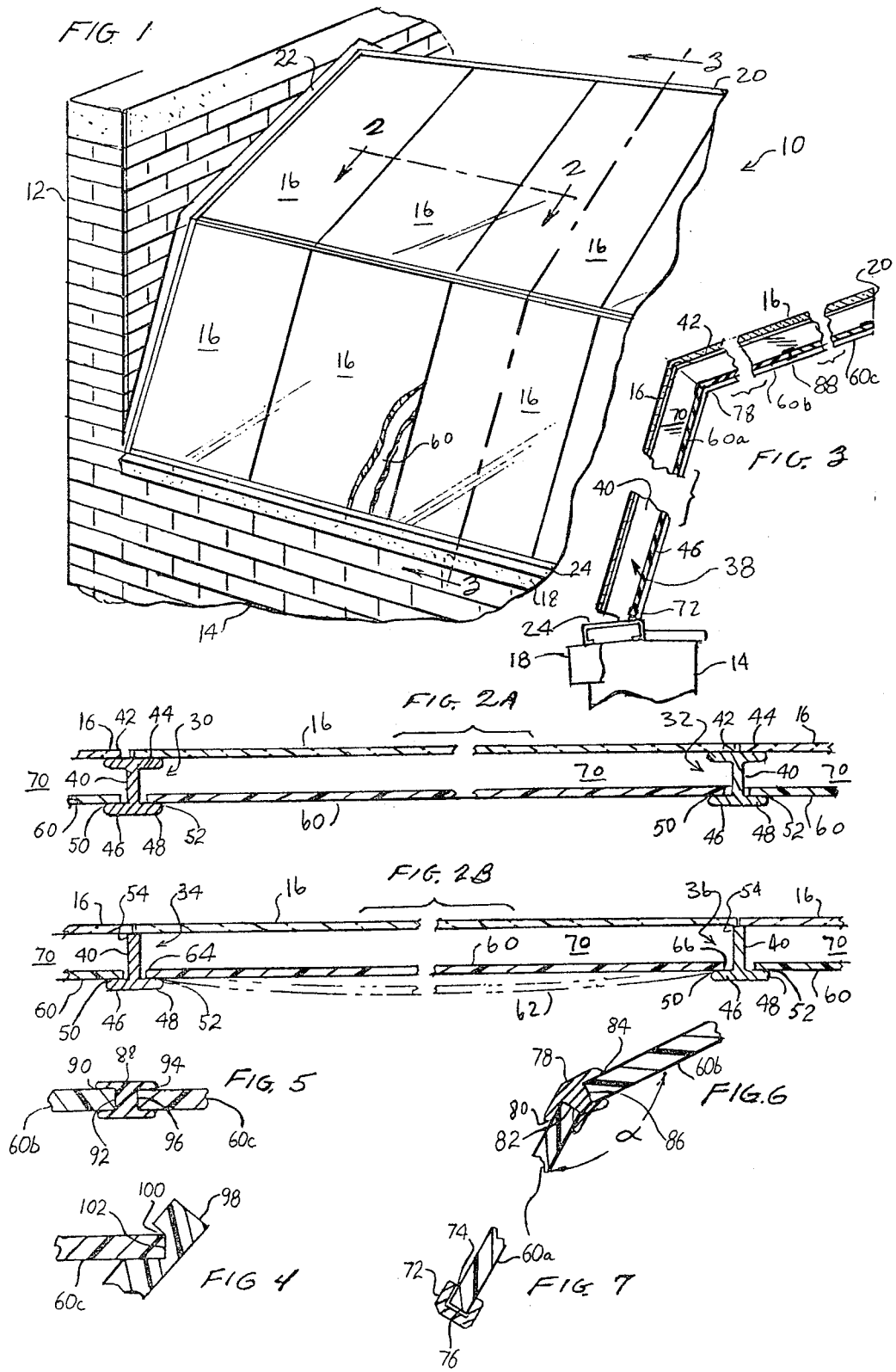

INTERIOR COVERING MATERIAL FOR A GREENHOUSE

BACKGROUND OF THE INVENTION

This invention relates generally to the glazing of windows. In particular, this invention relates to furnishing an interior formation of light transmitting material to an enclosure providing a greenhouse, covered atrium or other single glazed structures.

Contemporary design of buildings for use such as office space, often accents the design by furnishing a portion having a "greenhouse" environment or an atrium covered by transparent or translucent material. Conventional masonry walls are provided together with any desired type of roof. Certain areas then are enclosed with such as glass to provide the greenhouse effect. Such an effect is most desirable because of the open feeling associated therewith which is carried into the surrounding interior office space. Even small portions of a building providing a "greenhouse" effect gives the feeling of the entire building being open to the outdoors.

Many different ways are known to provide this "greenhouse" effect. Entire walls or roofs may be constructed with only glass or transparent plastic covering material. In one particular design, masonry walls are provided parallel one another spaced at regular intervals to separate individual offices. A low, exterior, masonry wall then is constructed between the walls to define the perimeter of the building. A roof is constructed terminating inwardly from the exterior wall.

The greenhouse covering then is provided by erecting aluminum mullions, vertically arranged from the sill of the low wall to the termination of the roof. These mullions are regularly spaced and carry plates or panes of glass which are attached thereto. The panes of glass are sealed to one another and the remainder of the building to prevent infiltration of the elements such as rain, snow, dust, wind etc. into the interior of the enclosure and to prevent the loss of heated or cooled air from the enclosure.

Energy conservation with such a single glazed structure can be poor, however. The single thickness of glass provides little insulation against the conduction of heat therethrough and the transmittance of radiant energy can be great. In winter, the heat interior of the enclosure is conducted and radiated outside through the glass. In summer, the radiant energy of the sun is transmitted inside. In short, the office is cold in winter and hot in summer. Large quantities of energy must be expended to overcome these effects in attempting to provide a stable office environment.

Shades and blinds may be provided to reduce the heat loss and gain through the glass, but these are unsightly and unwieldy and require constant attention as weather conditions change. Providing thermally insulating glass assemblies having two panes of glass separated by a sealed space of air can reduce the heat loss by conduction, but these assemblies are expensive and unless the glass is tinted, they affect the transmittance of radiant energy only minimally.

In accordance with the invention the structure of the greenhouse or covered atrium is furnished with a formation of interior covering material. The interior covering material and associated members form a sealed space therebetween to decrease the conduction of heat therethrough. The interior covering material additionally can be selectively tinted to decrease the transmission of radiant energy therethrough. The interior covering material is readily insertable and removable to facilitate cleaning and other maintenance requirements, but is firmly engaged in its installed position. Moreover, the interior covering material and associated members have an attractive appearance.

SUMMARY OF THE INVENTION

In accordance with the invention a greenhouse enclosure includes a plurality of vertically aligned mullions extending from a sill to a head of the enclosure. Each mullion includes a center post or standard having two margins: on one margin, the mullions carry panels of exterior covering material which is at least translucent and on the other margin the standards have two spaced apart flanges extending from opposite sides thereof, substantially parallel to the panels of exterior covering material.

This greenhouse enclosure is furnished with panels of flexible interior covering material which is at least translucent. The interior panels have a width less than the distance between standards of the mullions but greater than the distance between flanges of adjacent mullions, a length less than the distance from sill to head and a thickness less than the distance from the exterior panels to the flanges. The interior panels are flexed and inserted between adjacent mullions and rest on the flanges, on sides thereof adjacent the exterior panels, under their own weight.

Associated members are provided at at least the sill and head to furnish dimensional stability to the interior panels and provide seals for the space formed between the interior and exterior panels.

BRIEF DESCRIPTION OF THE DRAWING

FIG. 1 is a partial perspective view of the exterior of a greenhouse or covered atrium illustrating portions of an end and a side wall and panels of exterior and interior tranparent coverings, providing for light to enter the interior of the greenhouse or atrium, the interior coverings being constructed and arranged with a supporting structure in accordance with the invention;

FIGS. 2A and 2B are partial sectional views taken through FIG. 1 along the line 2—2 and in the direction indicated illustrating alternative embodiments of the supporting structure for the exterior coverings;

FIG. 3 is a partial sectional view taken through FIG. 1 along the line 3—3 and in the direction indicated;

FIG. 4 is a sectional view of a head member and the top edge of a panel of interior covering;

FIG. 5 is a sectional view of an upper intermediate member and adjacent edges of panels of the interior coverings;

FIG. 6 is a sectional view of a lower intermediate member and adjacent edges of panels of the interior coverings; and FIG. 7 is a sectional view of a bead member and the lower edge of a panel of the interior coverings.

DESCRIPTION OF THE PREFERRED EMBODIMENT

In FIG. 1 there is illustrated a portion of a greenhouse enclosure indicated generally by the reference character 10. Enclosure 10 includes an end wall 12, a side wall 14 and a plurality of exterior covering panels 16 carried by a supporting structure to be described in detail. The exterior covering panels 16 are formed of a suitable transparent or translucent material such as glass to provide protection for the interior of the enclosure 10 against the elements, and yet to provide for the transmittance of sun light to the interior of the enclosure 10. Panels 16 extend from a sill 18 of the building wall to a head 20 of the roof. Flashing 22 is provided to seal the space between panels 16 and end wall 12 against passage of the elements therebetween. A sill header 24 is provided between panels 16 and sill 18 also to seal against passage of the elements therebetween.

The enclosure 10 illustrated in FIG. 1 provides a curb roof, i.e., a roof having a center ridge with a double slope on either side. This is merely illustrative of a typical enclosure with which the invention may be practiced as the invention may provide any kind of roof desribed such as, half of a curb roof or a roof having a single slope, etc.

The supporting structure for the panels of exterior covering material is illustrated in FIGS. 2A, 2B and 3. This supporting structure is formed of a plurality of vertically aligned members or mullions, 30, 32, 34, 36 and 38. These mullions are spaced apart at regular intervals along the length of the enclosure and, as has been described, carry or support the panels 16. Mullions 30, 32 and 38 have a cross section in the shape of an "I" or "H", while mullions 34 and 36 have a cross section in the shape of a "T". The cross sectional shape of the mullions is provided mainly for dimensional stability or structural rigidity of the mullion.

All of the mullions include a central post or standard 40. Mullions 30, 32 and 38 further include flanges 42 and 44 at one margin of standard 40 and flanges 46 and 48 at the opposite margin. Mullions 34 and 36 include only one set of the flanges 46 and 48 at one margin of their standards 40. Flanges 46 and 48 are spaced from and are substantially parallel to the panels 16. Mullions 30, 32 and 38 carry the panels 16 of exterior covering material on the exterior surfaces of their flanges 42 and 44. Mullions 34 and 36 carry the panels 16 of the exterior covering material on the margins 54 of their standards 40.

In accordance with the invention, separate panels 60 of interior covering material are provided. These panels 60 are made of a flexible material which is at least translucent to transmit the light passing through the panels 16 to the interior of the enclosure. In a preferred embodiment the panels 60 are made of PLEXIGLAS.

The panels 60 are positioned relative to the mullions in panels 16 in such a way as they are readily removable for cleaning and other maintenance purposes and yet when installed, aid in insulating against the transfer of heat to and from the exterior and interior of the enclosure 10 through panels 16 and 60.

Referring to FIGS. 2A, 2B and 3, panels 60 have a width which is less than the distance between the standards 40 of the mullions but which is greater than the distance between flanges 46 and 48. Panels 60 have a thickness which is less than the thickness between the flanges 46 and 48 and the panels 16 of the exterior covering material. The panels 60 are inserted between the mullions by flexing the panels to cause a bow shape to be imparted thereto, as is illustrated with the dashed outline of a panel 62 in FIG. 2B, and inserting the lateral edges 64 and 66 of panels 60 between standards 40. Flanges 46 and 48 provide ledges having surfaces against which the lateral edges 64 and 66 of the panels 60 may rest under the weight of the panels 60. Contact between the surfaces 52 and 50 and panels 60 provide what may be thought of as seals against drafts of air passing therebetween. Stronger force winds would, of course, separate the lateral edges of the panels 60 from the surfaces 50 and 52, but such strong force winds typically are not present in the interior of enclosure 10. Together with end seals, which will be described presently, panels 16 and 60 and standards 40 of the mullions form spaces 70 which effectively are sealed from the environments of both the exterior and interior of the enclosure 10. These spaces 70 contain what may be referred to as "dead air" and are effective to prevent the conduction of heat therethrough. This is one means by which the panels 60 of interior covering material serve to insulate against the transfer of heat to and from the exterior and interior of the enclosure 10.

In FIG. 3 there are illustrated three essentially vertically arranged panels of interior covering material. These are identified from bottom to top as panels 60a, 60b and 60c. Between the panel 60a and sill member 24, there is a lower bead member 72 also illustrated in FIG. 7. Lower bead member 72 provides a U-shaped channel or groove 74 which receives a lower longitudinal edge 76 of panel 60a. Lower bead member 72 may be formed of any material desired such an extruded aluminum or an elastrometric material. Lower bead member 72 has a length approximately equal to the distance between mullions and the channel 74 as a width about equal to the thickness of the panels 60. Lower bead member 72 provides a seal for space 70 at the lower longitudinal edge of panel 68.

An intermediate member 78, also shown in FIG. 6, is provided between panels 60a and 60b to seal the space 70 therebetween. Intermediate member 78 includes a lower channel 80 for receiving the upper longitudinal edge 82 of panel 60a. Intermediate member 78 further includes an upper channel 84 which receives a lower longitudinal edge 86 of panel 60b. Intermediate member 78 has a length approximately equal to the distance between mullions and the channels 80 and 84 have a width about equal to the thickness of the panels 60a and 60b. Intermediate member 78 is formed to provide any desired angle between panels 60a and 60b which describes a dihedral angle. Intermediate member 78 may be formed of any material desired, and in a preferred embodiment is formed of extruded aluminum.

Another intermediate member, also shown in FIG. 5, is provided between the panels 60b and 60c. Intermediate member 88 includes a first channel 90 for receiving an upper longitudinal edge 92 of panel 60b. Intermediate member 88 further includes a second channel 94 for receiving a lower longitudinal edge 96 of panel 63. Intermediate member 88 has a length approximately equal to the distance between mullions and the channels 90 and 94 have a width equal to the thickness of panels 60b and 60c. Member 88 is made of any material desired, and in the preferred embodiment is formed of an aluminum extrusion. Intermediate member 88 forms a seal for the space 70 between the panels 60b and 60c.

A gasket 98 is provided adjacent the head 20 of the mullions. Gasket 98 includes a slot 100 for receiving the upper longitudinal edge 102 of panel 60c. Gasket 98 has a length approximately equal to the distance between mullions and is formed of any material desired. In the preferred embodiment, gasket 98 is formed of an elastrometric material such as rubber. Gasket 98 provides the seal at the upper longitudinal edge of panel 60c for space 70.

Lower bead member 72, intermediate member 78 and intermediate member 88 provide structural functions in addition to providing seals for the space 70. The panels 60 may have a width on the order of two to three feet. Being made of a flexible, resinous material such as PLEXIGLAS, panels having this width will tend to bow under their own weight due to the force of gravity. Lower bead member 72 provides a dimensional stability or structural rigidity for panel 60a against this bowing. In a like manner, intermediate members 78 and 88 provide dimensional stability or structural rigidity against the bowing of the panels 60b and 60c. The bowing of panels 60b and 60c may be more pronounced because the plane they define is more normal to the force of gravity than the plane defined by panel 60a and thus the force of gravity is greater on panels 60b and 60c. Hence, it is desired to provide the additional intermediate member 88 at the horizontal section of the mullions. An extra intermediate member is not required at the more steeply included panel 60a. Except for this desired dimensional stability, one panel of interior material could be provided instead of three.

Installation of the panels 60 of interior covering materials is as follows

The intermediate member 98 is installed between mullions and resting on flanges 46 and 48 at approximately its final resting position. A panel 60c of PLEXIGLAS is bowed and inserted behind the flanges 46 and 48 with its lower longitudinal edge engaged in the second channel of intermediate member 88. Then the gasket 98 is installed along the upper longitudinal edge of panel 60c.

The intermediate member 78 then is installed between mullions and resting on flanges 46 and 48. Panel 60b bowed and inserted between mullions with its lateral edges resting on flanges 46 and 48. The upper longitudinal edge of panel 60b is inserted in first channel 90 of intermediate member 98 and the lower longitudinal edge of panel 60b is inserted in the upper channel 84 of intermediate member 78.

The lower bead member 72 then is installed between mullions and resting against flanges 46 and 48 and panel 60a is bowed and inserted between mullions. The upper longitudinal edge of panel 60a is installed in the lower channel of intermediate member 78 and the lower longitudinal edge of 60a is installed in the U-shaped channel of the lower bead member. All three of the panels then are checked to insure that they are resting against the surfaces 50 and 52 of flanges 46 and 48. Installation then is complete.

As was stated previously, the first means providing insulation against transmittance of heat to and from the exterior and interior of the enclosure 10 are the spaces 70. The second means providing insulation against such transfer of heat is of course the material of the panels 60. This is provided by the material of the panel 60 insulating against conduction of heat therethrough, but also by panel 60 including some coloring or tinting to reduce the transmittance of radiant energy such as from the sun. The use of tints in the PLEXIGLAS may eliminate the need for blinds or other shading materials which often provide too much screening and require the use of electric lights, reducing the conservation factor provided by the effective double glazing of the enclosure covering.

Reference has been made herein to the transfer of heat from and to the exterior and interior of the enclosure 10 through the panels 16 and 60. This refers to the heat loss in winter which occurs through the panels from the interior to the exterior of enclosure 10 and also refers to the heat gain occuring in the summer through the panels 16 and 60 from the exterior to the interior of the enclosure 10.

The amount of heat which is transmitted through any structure typically is expressed as a "U" value. This "U" value is expressed as a number representing the number of BTU's (British Thermal Units) passing through the material per hour, per square foot, per degree Farenheit in temperature differential. It is known that a double glazed window using ¼" PLEXIGLAS panels with a ½" air space therebetween provides a "U" value of 0.43. The preferred embodiment of the present invention provides a 1½ inch distance between panels 16 and 60 in space 70 and it is believed that this provides a "U" value of about 0.37. In any event, the double glazing with the panels 60 of interior covering material saves energy considerably in excess of that saved with the use of conventional thermo-pane windows.

Modifications and variations of the present invention are possible in light of the above teachings. It is, therefore, to be understood that within the scope of the appended claims, the invention may be practiced otherwise than as specifically described.

What is claimed is:

1. For use in a greenhouse enclosure in which there are a plurality of vertically aligned mullions extending from a sill to a head, each mullion including a standard having two margins, on one margin the mullions carrying panels of exterior covering material which is at least translucent, and on the other margin each mullion including two spaced apart and oppositely extending flanges which are substantially parallel to the panels of exterior covering material, wherein the invention comprises:

at least one panel of flexible, interior covering material which is at least translucent, the panel having a width less than the distance between the standards but greater than the distance between the flanges of adjacent mullions, the panel having a length less than the distance from the sill to the head and having a thickness less than the distance from the panels of exterior covering material to the flanges, and the panel being flexed and inserted between adjacent mullions and resting on the flanges on sides thereof adjacent the panels of exterior covering material;

upper bead means arranged between a top edge of the interior covering material and the head for sealing the top edge to the head and furnishing dimensional stability to the interior covering material panel; and lower bead means arranged between a lower edge of the panel of interior covering material and the sill for sealing the lower edge of the panel to the sill and furnishing dimensional stability to the interior covering material panel;

so that the panel of interior covering material provides a second covering formation for the enclosure and so that the panels of exterior and interior covering material and the standards of adjacent mullions form a closed space and insulate against the transfer of energy from and to the exterior and interior of the greenhouse enclosure through the panels of covering material.

2. The invention as claimed in claim 1 wherein the panel of flexible, interior covering material is made of a synthetic resin and the panels of exterior covering material are glass.

3. The invention as claimed in claim 2 wherein the glass panels are clear and the synthetic resin panel is tinted.

4. The invention as claimed in claim 1 wherein the distance between the panels of interior and exterior covering material is about one and one half inches.

5. The invention as claimed in claim 1 wherein there are a plurality of panels of interior covering material vertically arranged between adjacent mullions and there are intermediate means arranged between adjacent edges of the plurality of panels for sealing the same and for furnishing dimensional stability to the same.

6. The invention as claimed in claim 5 wherein the intermediate means include an intermediate member providing opposed slots, the member being arranged between the interior panels with the adjacent edges of the interior panels being positioned in the slots.

7. The invention as claimed in claim 6 wherein the interior panels are arranged to form a dihedral angle and the intermediate member provides opposed slots at that angle.

8. The invention as claimed in claim 1 wherein the upper bead means include an upper bead member having a length about equal to the width of the panel of interior covering material and a slot having a width about equal to the thickness of the interior panel of interior covering material, the upper bead member being arranged between the top edge of the interior covering material and the head with the top edge being positioned in the slot.

9. The invention as claimed in claim 1 in which the lower bead means include a lower bead member having a length about equal to the width of the panel of interior covering material and a groove having a width about equal to the thickness of the panel of interior covering material, the lower bead member being arranged between the lower edge of the panel of interior covering material and the sill with the lower edge being positioned in the groove.

10. A combination comprising:
a greenhouse enclosure in which there are a plurality of vertically aligned mullions extending from a sill to a head, each mullion including a standard having two margins, on one margin the mullions carrying panels of exterior covering material which is at least translucent, and on the other margin each mullion including two oppositely extending flanges which are spaced from and substantially parallel to the panels of exterior covering material;
at least one panel of flexible interior covering material which is at least translucent, the panel having a width less than the distance between the standards but greater than the distance between the flanges of adjacent mullions, the panel having a length less than the distance from the sill to the head and having a thickness less than the distance from the panels of exterior covering material to the flanges, and the panel being flexed and inserted between adjacent mullions and resting on the flanges on sides thereof adjacent the panels of exterior covering material;
upper bead means arranged between a top edge of the interior covering material and the head for sealing the top edge to the head and furnishing dimensional stability to the interior covering material panel; and
lower bead means arranged between a lower edge of the panel of interior covering material and the sill for sealing the lower edge to the sill and furnishing dimensonal stability to the interior covering material panel;
so that the panel of interior covering material provides a second glazing for the enclosure and so that the panels of exterior and interior covering material and the bodies of adjacent mullions form a closed space and insulate against the transfer of energy from and to the exterior and interior of the greenhouse enclosure through the panels of covering material.

11. The invention as claimed in claim 10 wherein the panel of flexible, interior covering material is made of a synthetic resin and the panels of exterior covering material are glass.

12. The invention as claimed in claim 11 wherein the glass panels are clear and the synthetic resin panel is tinted.

13. The invention as claimed in claim 10 wherein the distance between the panels of interior and exterior covering material is about one and one half inches.

14. The invention as claimed in claim 10 wherein there are a plurality of panels of interior covering material vertically arranged between adjacent mullions and there are intermediate means arranged between adjacent edges of the plurality of panels for sealing the same and for furnishing dimensional stability to the same.

15. The invention as claimed in claim 14 wherein the intermediate means include an intermediate member providing opposed slots, the member being arranged between the interior panels with the adjacent edges of the interior panels being positioned in the slots.

16. The invention as claimed in claim 15 wherein the interior panels are arranged to form a dihedral angle and the intermediate member provides opposed slots at that angle.

17. The invention as claimed in claim 10 wherein the upper bead means include an upper bead member having a length about equal to the width of the panel of interior covering material and a slot having a width about equal to the thickness of the interior panel of interior covering material, the upper bead member being arranged between the top edge of the interior covering material and the head with the top edge being positioned in the slot.

18. The invention as claimed in claim 10 in which the lower bead means include a lower bead member having a length about equal to the width of the panel of interior covering material and a groove having a width about equal to the thickness of the panel of interior covering material, the lower bead member being arranged between the lower edge of the panel of interior covering material and the sill with the lower edge being positioned in the groove.

* * * * *